UNITED STATES PATENT OFFICE.

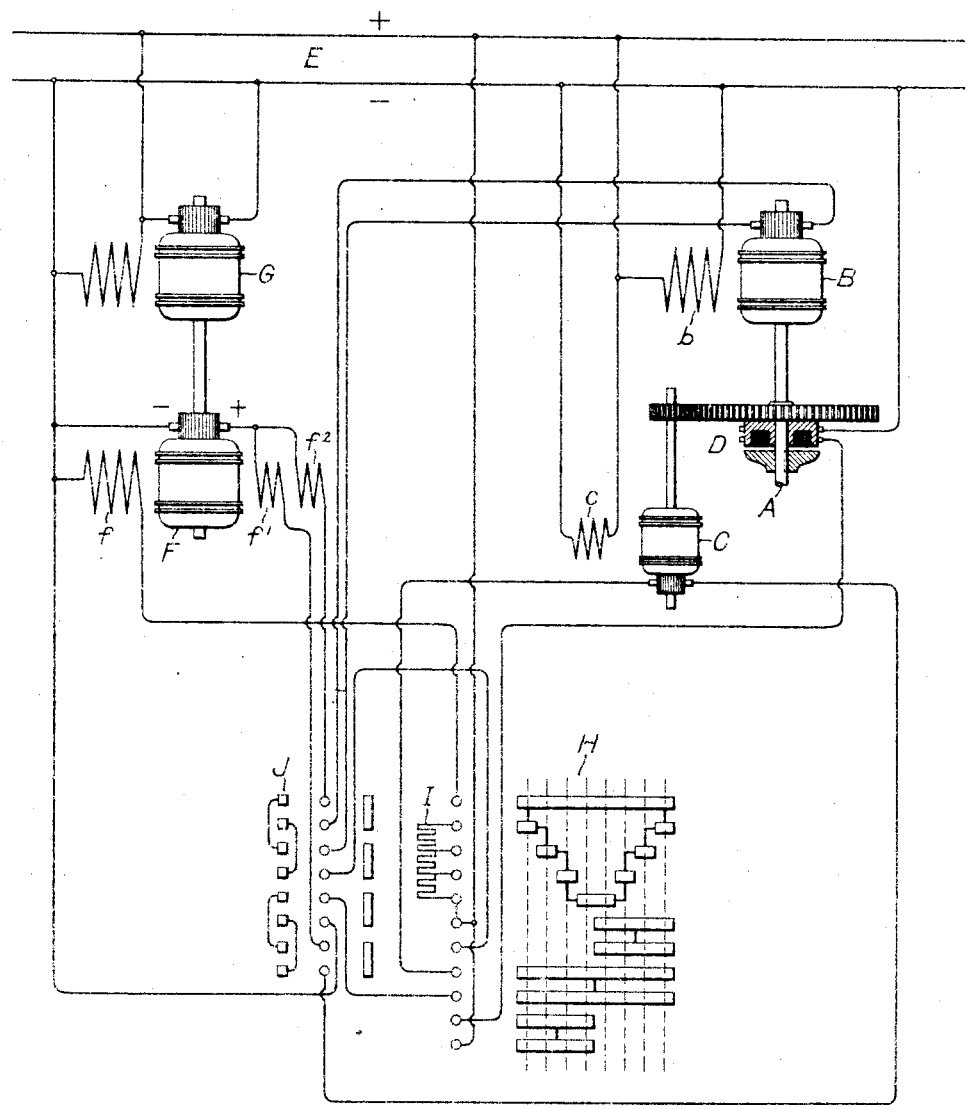

MAXWELL W. DAY, OF SCHENECTADY, NEW YORK, ASSIGNOR TO GENERAL ELECTRIC COMPANY, A CORPORATION OF NEW YORK.

MOTOR-CONTROL SYSTEM.

No. 869,352.

Specification of Letters Patent.

Patented Oct. 29, 1907.

Application filed March 6, 1907. Serial No. 360,808.

*To all whom it may concern:*

Be it known that I, MAXWELL W. DAY, a citizen of the United States, residing at Schenectady, county of Schenectady, State of New York, have invented certain new and useful Improvements in Motor-Control Systems, of which the following is a specification.

My invention relates to motor-control systems in which two motors are employed for driving a load at different speeds.

When it is desired to drive a load at speeds varying over wide ranges, as in the case of turrets on battleships, printing-presses, etc., it has been proposed heretofore to employ two motors,—one connected to the load through low-speed gearing, and the other, which is ordinarily a larger motor, connected to drive the load at high-speed. The most satisfactory method of varying the speed of the motors consists in supplying variable voltages to their terminals, and a convenient arrangement for deriving such a voltage from a constant potential supply consists in employing a motor generator set with means for varying the generator voltage. But when such an arrangement is applied in its simplest form to such a motor-drive, as above described difficulties arise, since just before the transition from the low-speed motor to the high-speed motor, the low-speed motor is operating with maximum impressed voltage, while immediately after the transition the minimum voltage is required for the high-speed motor, and it is impossible to reduce the generator voltage instantaneously from its maximum to its minimum value.

By my invention the reduction of the generator voltage when transferring from one motor to the other is rendered unnecessary. I accomplish this result by arranging the controlling means so as first to connect the low-speed motor to the generator and gradually to increase the generator voltage in the usual manner, and then, instead of connecting the generator for supplying current to the high-speed motor, I connect the high-speed motor and generator in series to the constant potential mains, so that the generator furnishes a counter-electromotive force, and the voltage impressed on the motor terminals is the difference between the voltage of the mains and the generator voltage. Thus, in making the transition from the low-speed motor to the high-speed motor, the generator is kept at its maximum voltage, so that the transition may be made as quickly as desired. After the transition has been made, the generator voltage is gradually reduced, thereby increasing the voltage impressed on the motor terminals.

My invention will be best understood by reference to the accompanying drawing, which shows diagrammatically a motor-control system arranged in accordance with my invention.

In the drawing A represents a driven shaft which may be connected to the load in any suitable manner, and which carries the armature B of the larger or high-speed motor. The field of this motor is represented at $b$. C represents the armature of the smaller or low-speed motor, which is connected to the shaft A through a pinion and gear, and a magnetic clutch D. When clutch D is energized the motor armature C is connected to the shaft A through the speed-reducing gearing formed by the pinion and gear. When clutch D is deënergized, armature C is disconnected from the driven shaft. $c$ represents the field of the low-speed motor. The motor fields $b$ and $c$ may be excited directly from the constant potential mains E. F represents a generator armature driven by the constant-speed shunt motor G supplied from the mains E. The generator has a main field winding $f$ supplied from the mains and arranged to be varied as to its strength. A series winding, preferably comprising two coils, $f^1$ and $f^2$, is provided, and the coils are connected in circuit alternately when the low-speed and high-speed motors are operated, respectively. The purpose of the series winding is to prevent a variation of load from affecting the speed of the motors, as will be hereinafter explained. H represents a controlling switch for varying the field-strength of the generator F, and for controlling the connections of the motors and clutch D. I represents a variable resistance adapted for connection in the main field $f$ of the generator. J represents a reversing switch.

The switches H and J are shown in off-position. To start the load, reversing switch J is thrown in either direction, according to the direction in which the load is to be driven, and the main switch H is moved to its first operating position. If reversing switch J has been moved to bring the right-hand movable contacts into engagement with the contact-fingers, then when switch J is moved to its first operating position, the circuit of the generator field winding $f$ is closed as follows: from the lower main E, through the field winding $f$, through all of resistance I, to the upper line-wire E. At the same time a circuit is closed from the right-hand brush of generator F through series winding $f^1$, reversing switch J, motor armature C, switch H, switch J, lower line wire E to the left-hand brush of generator F. A third circuit is closed from the lower main E, through clutch winding D and switch H, to upper main E. Since all of resistance I is included in circuit with the main field winding of the generator, the generator is operating at its minimum voltage; and since the generator is connected to the motor armature C, and clutch D is energized, the motor C starts and drives the load at minimum speed. In moving switch H through its next three positions, resistance I is gradually cut out of circuit; thereby increasing the voltage of generator F and the speed of motor C. In passing from the fourth to the fifth position of switch H, the circuit of clutch D is broken; thereby disconnecting the low-speed motor from the load, and at the same time a circuit is closed from the lower main E to the left-hand brush of generator F, through the generator armature and the right-hand brush, through field winding $f^2$, switch J, motor armature B, switch J, switch H, to upper main E. Consequently, motor armature B and generator armature F are connected in series to the constant potential mains E. The relative polarities of the mains and of the generator are indicated by plus and minus signs. It will be seen that the voltage impressed on motor armature B is the difference between the voltage of the mains and the generator voltage. Since the generator voltage is at its maximum value, a small voltage is impressed on the motor armature B. Consequently, this motor operates at its minimum speed, which is approximately equal to the maximum speed of the motor armature C multiplied by the gear ratio. The transition from one motor to the other is thus made smoothly and without altering the potential of the generator. As switch H is moved through its further positions resistance I is again gradually cut into the circuit of field winding $f$, thereby reducing the generator voltage and increasing the impressed voltage and speed of motor armature B. Motor armature C may be left connected across the generator terminals, so that it runs idle, while the high-speed motor is operating, but on the reverse movement of switch H is brought up to its maximum speed so as to take up the load when the circuit of the high-speed motor is broken in passing from the fifth to the fourth position of the switch.

It will be seen that when the low-speed motor is operating, the series field winding $f^1$ of the generator is in circuit. This winding acts to compound the generator for varying load on the motor, so as to hold the motor speed, when once adjusted, substantially constant. When motor B is operating, the generator field winding $f^2$ is in circuit, and it will be noted that since the generator is now operating to provide a counter-electromotive force,—or in other words, is running as a motor, the current through field winding $f^2$ is in the opposite direction as compared with the current flow through the field winding $f$, when the latter was in circuit. Consequently, field winding $f^2$ acts as a differential winding to oppose the main magnetization of the generator. Consequently, when the load on the large motor B increases, thereby increasing the current, the voltage of generator F is decreased with a resultant increase of impressed voltage on the motor B. If the same number of series turns suffices for compounding the generator, when the low-speed motor is running, and for furnishing the differential excitation when the high-speed motor is running, a single series winding may be used on the generator. Ordinarily, however, different numbers of turns are required for the two operations, so that two series windings will ordinarily preferably be employed.

I do not desire to limit myself to the particular construction and arrangement of parts here shown, but aim in the appended claims to cover all modifications which are within the scope of my invention.

What I claim as new and desire to secure by Letters Patent of the United States, is,—

1. In combination with a load to be driven, an electric motor adapted to drive the load at low speed, a second motor adapted to drive the load at a higher speed, a source of constant voltage, a source of variable voltage, and controlling means for said motors arranged to connect the first motor to the source of variable voltage and gradually increase said voltage, and then to connect the second motor and the source of variable voltage in series to the source of constant voltage and gradually to reduce the voltage of the variable source.

2. In combination with a load to be driven, an electric motor adapted to drive the load at low speed, a second motor adapted to drive the load at a higher speed, constant potential mains, a generator provided with means for varying its voltage, and controlling means arranged to connect the generator to the first motor and gradually to increase its voltage, and then to connect the second motor and the generator in series to the mains and gradually to reduce the generator voltage.

3. In combination with a load to be driven, an electric motor adapted to drive the load at low-speed, a second motor adapted to drive the load at a higher speed, constant potential mains, a generator provided with means for varying its voltage, and controlling means arranged to connect the generator to the first motor and gradually to increase its voltage, and then to disconnect the first motor mechanically from the load and to connect the second motor and the generator in series to the mains and gradually to reduce the generator voltage.

4. In combination with a load to be driven, an electric motor adapted to drive the load at low speed, a clutch between said motor and the load, a second motor adapted to drive the load at a higher speed, a source of constant voltage, a source of variable voltage, and controlling means for said motors adapted to actuate said clutch and to connect the first motor to the source of variable voltage, then gradually to increase said voltage, then to disengage said clutch and to connect the second motor and the source of variable voltage in series to the source of constant voltage, and then gradually to reduce the voltage of the variable source.

5. In combination with the load to be driven, an electric motor adapted to drive the load at low speed, a second motor adapted to drive the load at a higher speed, constant potential mains, a generator provided with means for varying its voltage, and controlling means arranged to connect the generator to the first motor and gradually to increase its voltage, and then to connect the second motor and the generator in series to the mains and gradually to reduce the generator voltage, said generator having a series field winding adapted to assist the main field magnetization when the generator is connected to the first motor and to oppose the main field magnetization when the generator is connected to the second motor.

6. In combination with a load to be driven, an electric motor adapted to drive the load at low speed, a second motor adapted to drive the load at a higher speed, constant potential mains, a generator having a main field winding of variable strength and two series field windings, and controlling means arranged to connect the generator to the first motor with one series winding in circuit and gradually to increase the strength of the main field winding, and then to connect the second motor and the generator in series to the mains with the other series field winding in circuit and gradually to reduce the strength of the main field winding.

In witness whereof, I have hereunto set my hand this 5th day of March, 1907.

MAXWELL W. DAY.

Witnesses:
BENJAMIN B. HULL,
HELEN ORFORD.